US005208085A

United States Patent [19]

Pace

[11] Patent Number: 5,208,085

[45] Date of Patent: May 4, 1993

[54] INK OR DYE-FILLED BLISTER PACKS

[76] Inventor: Marvin B. Pace, 2955 Shiloh Rd., Ludlow Falls, Ohio 45339

[21] Appl. No.: 746,729

[22] Filed: Aug. 19, 1991

[51] Int. Cl.⁵ .......... B32B 3/02

[52] U.S. Cl. .......... 428/43; 428/178; 206/532; 109/25; 109/31; 109/34

[58] Field of Search .......... 428/43, 72, 178; 109/25, 29, 31, 34; 206/532

[56] References Cited

U.S. PATENT DOCUMENTS

| | | | |
|---|---|---|---|
| 3,463,532 | 8/1969 | Chidley et al. | 292/307 |
| 3,564,525 | 3/1971 | Robeson et al. | 340/224 |
| 3,581,703 | 6/1971 | Hosack | 116/67 |
| 4,226,194 | 10/1980 | Grahn | 109/25 |
| 4,607,579 | 8/1986 | Stenild | 109/25 |
| 4,649,397 | 3/1987 | Heaton et al. | 343/895 |
| 4,698,620 | 10/1987 | Marshall | 340/568 |
| 5,000,379 | 3/1991 | LaRue | 232/17 |

*Primary Examiner*—Alexander S. Thomas
*Attorney, Agent, or Firm*—Biebel & French

[57] ABSTRACT

A device is provided for deterring vandalism to exposed exterior surfaces, particularly the exposed surfaces of mailboxes or other receptacles which may be positioned adjacent to roadways. The invention includes a plurality of nodules filled with a mixture including a dye. The nodules are positioned on the exterior surface of the structure to be protected and upon being impacted will propel the dye mixture in a predetermined direction to form a mark on the person performing the vandalism.

17 Claims, 3 Drawing Sheets

INK OR DYE-FILLED BLISTER PACKS

BACKGROUND OF THE INVENTION

The present invention relates to a device for deterring vandalism to exposed exterior surfaces of structures and, more particularly, to a device for propelling a marking substance onto vandals attempting to destroy structures such as mailboxes.

A common problem faced by homeowners as well as by owners of businesses having mailboxes, as well as receptacles for newspapers, which are located adjacent to a roadway is that vandals will often drive by the mailbox or receptacle and strike it with a baseball bat or other object. The results of such vandalism is typically a dented mailbox or a broken mailbox post which must be replaced. While many owners may be tolerant of such an occurrence if it only occurs once, many homeowners who live in rural areas typically experience such vandalism several times a year and the cost and time involved in replacing mailboxes quickly becomes intolerable.

Several solutions have been proposed for solving this problem including constructing the boxes out of a resilient material such as plastic or rubber. Other solutions include providing a post which may pivot in response to an impact force. While these solutions provide a certain degree of relief from vandalism, they do not deter the vandals from continually returning to strike the mailbox until it eventually deteriorates.

Accordingly, there is a need for a device which may be used in combination with a mailbox, or other structure which may be subject to destruction by impact forces, which device will deter vandals from striking the structure.

SUMMARY OF THE INVENTION

The present invention provides a device for deterring vandalism to exposed exterior surfaces of receptacles such as mailboxes or other structures. The device includes nodules which may be attached to the exterior surface of the structure to provide a deterring effect.

The nodules include a substantially planar surface for mounting the device to the exposed exterior surface and a dispersion wall portion extends from the substantially planar surface in a direction substantially perpendicular to the planar surface. A body portion defining a longitudinal axis of the nodule extends in a direction from the dispersion wall portion and defines a cavity for the nodule.

A mixture of an ink or dye and an incompressible substance having fluid characteristics is provided for being contained within the cavity of the nodule. The incompressible substance preferably has characteristics resembling a non-newtonian fluid such as is provided by petroleum jelly.

A weakened burst line is formed on the nodule such that a predetermined minimum impact force exerted on the body portion will cause the mixture to press against and break the burst line. The location of the burst line relative to the body portion is such that when the predetermined minimum impact force is applied against the body portion, the mixture will be propelled in a direction generally parallel to the axis and in a direction opposite from that in which the body portion extends from the dispersion wall portion.

Thus, as a result of the impact force, any person striking the nodule will be sprayed with a dye mixture, and if the person is riding in a vehicle, the vehicle will also be sprayed with the dye mixture. In this manner, the person and any vehicle causing the vandalism will be easily identified.

Further, in the event that the vandalism is done by kids borrowing their parent's vehicle, this provides an additional deterring effect in that the discoloration of the vehicle caused by the dye may lead to unavailability of the vehicle for further vandalism on other occasions, as use of the vehicle is restricted by the parents.

It is therefore an object of the present invention to deter vandalism experienced by owners of structures such as mailboxes and other receptacles.

It is a further object of the invention to provide a vandalism deterring device which semi-permanently marks the vandals such that the vandal must account for his actions.

Other objects and advantages of the invention will be apparent from the following description, the accompanying drawings, and the appended claims.

DETAILED DESCRIPTION OF THE PREFERRED EMBODIMENT

Figure 1:
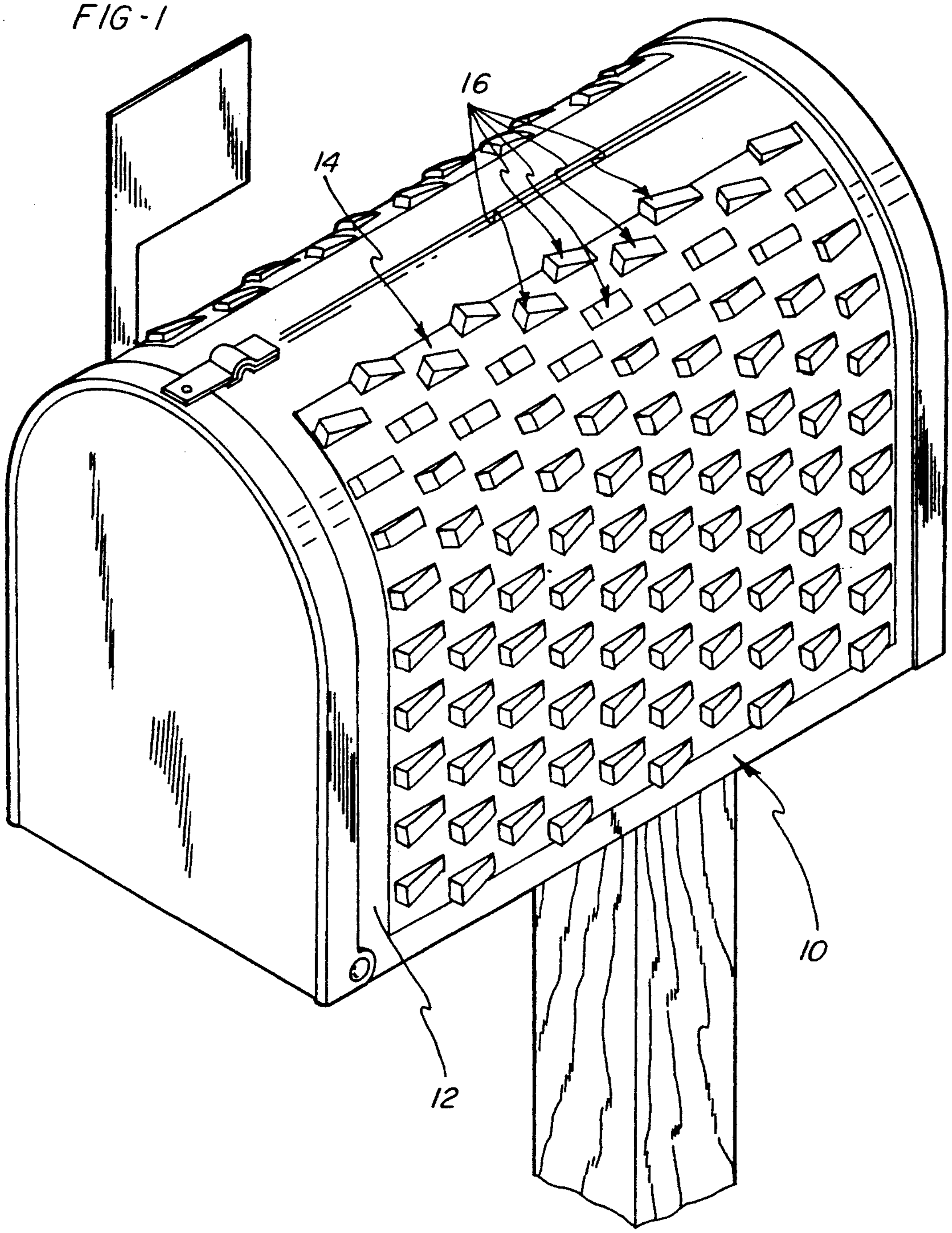
FIG. 1 is a perspective view of the present invention in place on a mailbox.

As may be seen in FIG. 1, the device 10 of the present invention is adapted to be attached to the exterior surface of a mailbox 12 or to a newspaper receptacle or any other structure which may be subject to vandalism as a result of an object impacting the structure.

The vandalism deterring device 10 of the present invention preferably includes a substantially planar panel 14 to which is mounted a plurality of nodules 16. As may be seen in FIG. 2, the nodules 16 include a dispersion wall 18 extending substantially perpendicularly from a first surface 20 of the panel 14. A body portion 22 defines a longitudinal axis 24 of the nodule 16 and extends longitudinally from the dispersion wall 18. In the preferred embodiment, the body portion is approximately 1 to 1¼ inch long and has a maximum height of approximately ¼ inch.

As may be seen in FIG. 1, the nodules 16 are distributed substantially uniformly across the panel 14. Further, the nodules 16 define a protective area on the panel 14 having a widthwise and lengthwise dimension which dimensions are defined by a plurality of nodules positioned at locations spaced both longitudinally and transversely relative to each other across the panel 14. Thus, the panel 14 is capable of providing protection for substantially the entire surface area of the structure to be protected such as the mailbox 12.

Figure 2:
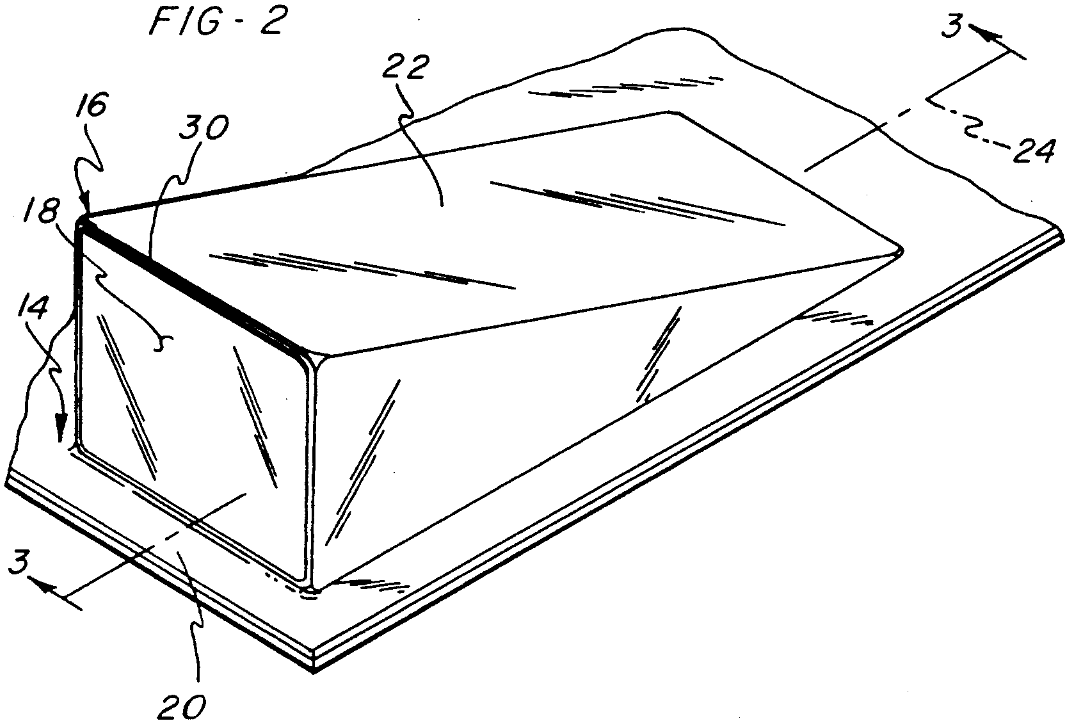
FIG. 2 is a perspective view of a nodule for use in the device of the present invention including a weakened burst line molded into the nodule.
Figure 3:
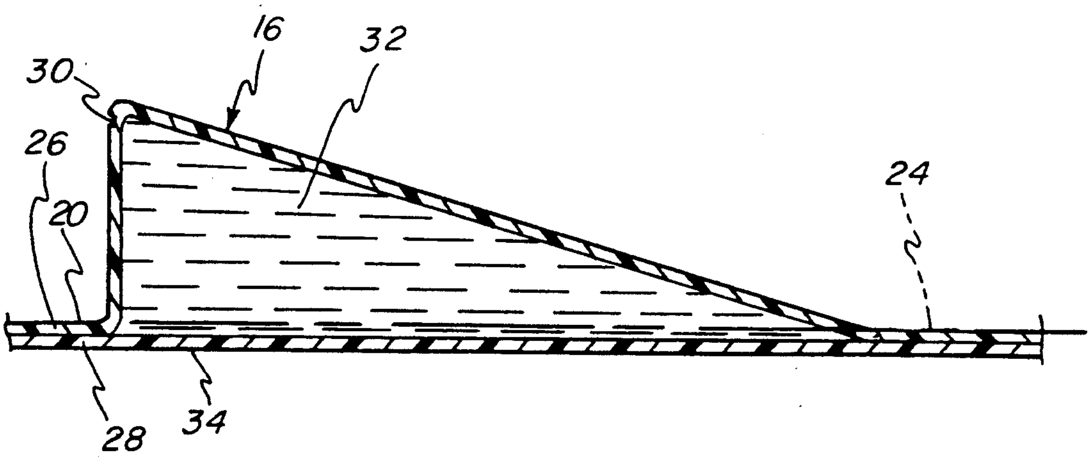
FIG. 3 is an elevational cross-sectional view taken along line 3—3 in FIG. 2.

Referring to FIG. 3, the panel 14 having nodules 16 may be formed with a construction similar to that used to form blister packs and are preferably formed from a highly plasticized plastic material such as highly plasticized polyethylene. Specifically, a first upper panel 26 may be provided having the nodules 16 molded therein. A second lower layer 28 may be provided bonded to the upper layer 26 to form a sealed cavity within the nodules 16. In addition, a weakened area preferably in the form of a weakened burst line 30 is provided in the nodules 16 and, in FIGS. 2 and 3, is shown as an area of substantially reduced thickness at the juncture between the dispersion wall 18 and the body portion 22. Further, the weakened burst line 30 of each of the nodules 16 is located at a forward portion of the nodules 16 relative to the body portion 22 and the axes 24 of all of the body portions 22 are aligned substantially parallel to each other (see FIG. 1).

It should be apparent that in the above construction the dispersion wall 18, burst line 30 and body portion 22 may be molded integrally with each other prior to bonding layer 26 to layer 28.

Each of the nodules 16 is filled with a marking substance 32. In the preferred embodiment, the substance comprises a mixture of petrolatum or petroleum jelly and a permanent dye or ink. Petroleum jelly is an incompressible semi-solid material which displays characteristics of a non-newtonian fluid. Thus, when a nodule 16 containing the mixture of petroleum jelly and dye is impacted, the mixture 32 will cause an increase in internal pressure within the container formed by the nodule 16. When a predetermined compressive force is applied to the exterior of the nodule 16, a predetermined pressure is created within the nodule 16, and the container will be opened along the burst line 30 causing the mixture 32 to be propelled in a direction generally parallel to the axis 24 and in a direction opposite from the one in which the body portion 22 extends from the dispersion wall portion 18.

An advantage of using a semi-solid substance such as petroleum jelly within the nodule 16 is that as the mixture 32 is propelled from the nodule 16 it will travel forwardly as a substantially coherent mass rather than being dispersed radially or laterally outwardly as would be the case if the dye were packaged within the nodule 16 as a powder or liquid substance. Further, as may be noted in FIG. 3, the nodule 16 has a substantially triangular profile which facilitates the distribution of the mixture 32 forwardly toward the burst line 30 when an impact force is applied to thereby ensure that substantially all of the mixture 32 is propelled out of the nodule 16.

It should be noted that a second surface 34 formed on the second layer 28 on an opposite side of the panel 14 from the first surface 20 is preferably provided with an adhesive layer whereby the device 10 may be adhered to the exterior surface of a structure. The adhesive layer may be of any conventional substance having tacky characteristics such as double sided adhesive tape, silicone rubber or epoxy.

Figure 4:
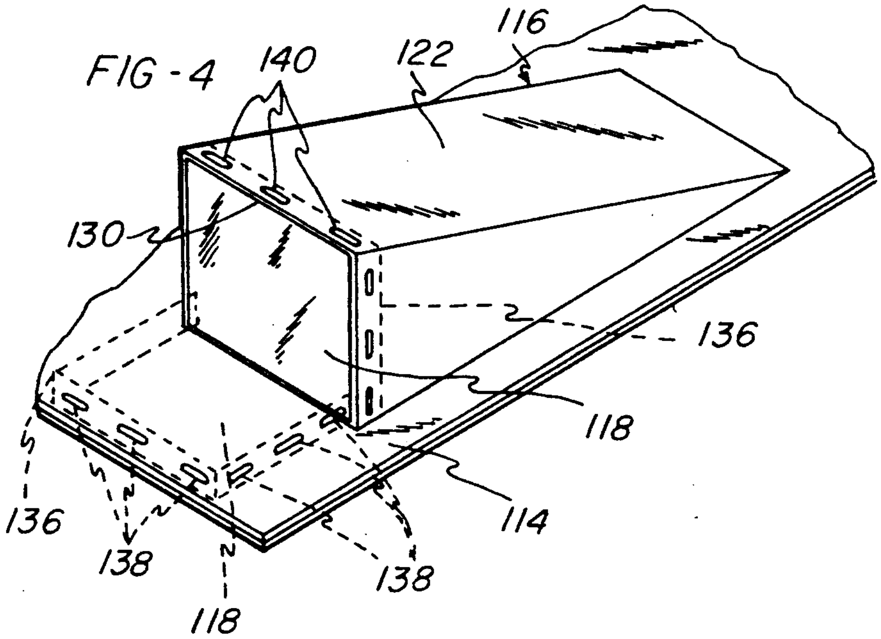
FIG. 4 is a perspective view of a nodule in which a weakened burst line is formed by a seam between a dispersion wall and a body portion of the nodule.

Referring to FIG. 4, an alternative construction of the nodes is shown. In this embodiment, the node 116 includes a body portion 122 similar to that of the previous embodiment and the dispersion wall 118 is held adjacent to the body portion 122 by a hinge connection adjacent to the panel 114. In order to contain the petroleum jelly and dye mixture within the nodule 116, a lip portion 136 extends around the periphery of the dispersion wall 118 for fitting within and forming a seam with the forward end of the body portion 122 in an area of overlap.

In order to facilitate maintaining the dispersion wall 118 in closed position at the end of the body portion 122, a plurality of recesses 138 may be molded into the lip portion 136 and a plurality of corresponding detent portions 140 may be provided extending inwardly to contact and lockingly engage the recesses 138. Thus, the dispersion wall 118 will be held in place within the edge of the body portion 122 by interlocking detent and recess means.

Further, since the dye mixture is in the form of a semi-solid substance such as petroleum jelly, the burst line 130 formed at the overlap between the lip portion 136 and the body portion 122 need not be a fluid-tight seal. This has the advantage that a reduced impact force would be required to open the container formed by the nodule 116 and propel the dye mixture forwardly. It should be noted that the open position of the dispersion wall 118 is shown in dotted lines.

Figure 5:
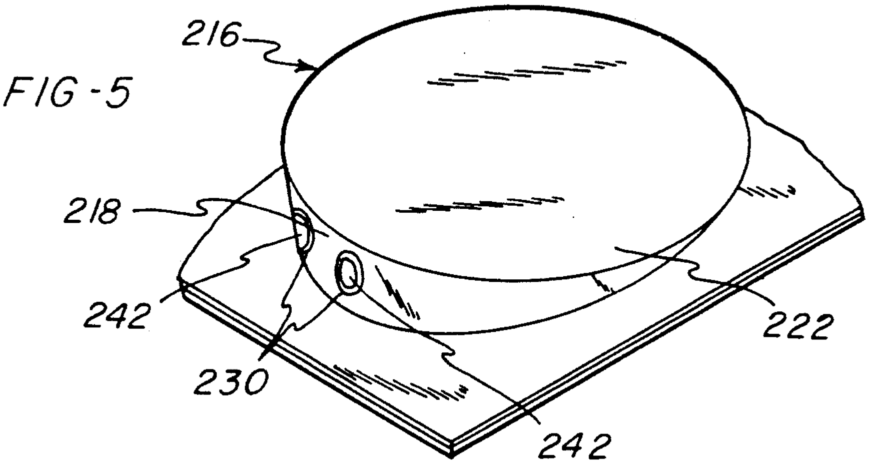
FIG. 5 is a perspective view showing the nodule of the present invention in which the weakened burst line is in the form of a plurality of circular areas formed on one side of the nodule.

FIG. 5 shows an alternative embodiment in which the nodule 216 is formed having a substantially triangular profile as in the previous embodiments. However, the burst lines 230 define a pair of circular weakened areas 242 in the dispersion wall 218. The burst lines 230 as well as the weakened areas 242 may be formed of thinner material than the dispersion wall 218, or alternatively, the weakened areas 242 enclosed by the burst lines 230 may be formed of the same material thickness as the dispersion wall 218. In either case, when an impact force is applied to the body portion 222, the cavity defined by the nodule 216 will open at the weakened areas 242 and the circular apertures defined by these areas will act as nozzles for propelling the dye mixture outwardly from the nodule 216.

Figure 6:
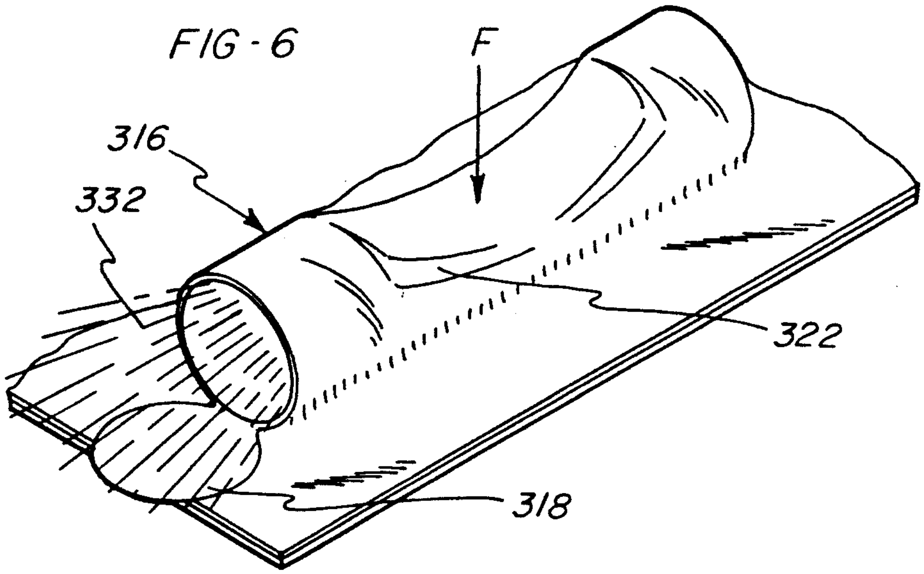
FIG. 6 is an alternative shape for the nodule and shows the nodule after being impacted with a predetermined force to propel material within the nodule in a predetermined direction.

A final embodiment is shown in FIG. 6 in which the nodule 316 is shown configured substantially as a cylinder. It should be noted that in this figure a force F is depicted being applied to the body portion 322 to distort the body portion 322 inwardly causing the dispersion wall 318 to move away from the body portion 322 at a weakened burst line thereby permitting the mixture 332 to spray outwardly in a forward direction from the body portion 322. In the preferred embodiment, the cylinder shaped nodule 316 would have a length of $1\frac{1}{2}$ to 2 inches and a height or diameter of $\frac{3}{8}$ inch.

It should be noted that although petroleum jelly is used for the mixture in the embodiments described above, other substances may be used having similar characteristics to petroleum jelly. One characteristic of petroleum jelly which makes it particularly useful in the present invention is that its state remains substantially unchanged throughout a wide temperature range. This is particularly important since the device of the present invention must be used in freezing conditions as well as in conditions involving extreme heat such as when the sun is shining on a metal mailbox during a summer day.

Further it should be noted that by forming the nodules of a highly plasticized plastic material, the nodules are prevented from becoming brittle in cold conditions.

While the forms of apparatus herein described constitute preferred embodiments of the invention, it is to be understood that this invention is not limited to these precise forms of apparatus, and that changes may be made therein without departing from the scope of the invention which is defined in the appended claims.

What is claimed is:

1. A device for deterring vandalism to exposed exterior surfaces, said device comprising:

nodule means including a substantially planar surface for mounting said device to said exposed exterior surface, a dispersion wall portion extending from said substantially planar surface and a body portion defining an axis extending in a longitudinal direction from said dispersion wall portion, a mixture of a dye and an incompressible substance having fluid characteristics, said mixture being contained within said nodule means, and weakened burst line means formed on said nodule whereby a predetermined minimum impact force exerted on said body portion will cause said mixture to press against and break said burst line means such that said mixture is propelled in a direction generally parallel to said axis and opposite from the direction in which said body portion extends from said dispersion wall portion.

2. The device of claim 1, wherein said burst line means is defined by an area of reduced thickness formed around said dispersion wall portion.

3. The device of claim 1, wherein said incompressible substance is a semi-solid material.

4. The device of claim 3, wherein said incompressible substance is petroleum jelly.

5. The device of claim 1, wherein said body portion has a substantially triangular profile tapering downwardly toward said substantially planar surface as it extends along said axis from said dispersion wall portion.

6. The device of claim 1, wherein said burst line means comprise a plurality of spaced weakened areas formed in said dispersion wall portion.

7. The device of claim 6, wherein said spaced weakened areas are each defined by circular areas of reduced material thickness.

8. The device of claim 1, wherein said dispersion wall portion overlaps said body portion and said burst line means is defined by a seam formed at the overlap between said dispersion wall and said body portion.

9. The device of claim 1, wherein said substantially planar surface for mounting said device includes an adhesive layer for attaching said device to said exposed exterior surface.

10. A device for deterring vandalism to exposed exterior surfaces of structures from resulting impacting the structure with an object, said device comprising:

a substantially planar panel portion for mounting said device to said exposed surface, a dispersion wall portion extending from said panel portion in a direction transverse to said panel portion, a body portion formed integrally with said dispersion wall portion and defining, in combination with said dispersion wall portion and said panel portion, a cavity, an ink or dye substance contained within said cavity, and weakened burst line means formed integrally with said dispersion wall portion and defining a structurally weakened portion of said cavity whereby a predetermined impact force exerted on said body portion will cause said ink or dye substance to press against and break said burst line means such that said ink or dye substance is propelled laterally outwardly substantially parallel to said substantially planar panel portion.

11. The device of claim 10, wherein said ink or dye substance comprises a mixture of an ink or dye and petroleum jelly.

12. The device of claim 10, wherein said burst line means comprises an area of reduced material thickness.

13. A device for deterring vandalism to exposed exterior surfaces of structures resulting from impacting the structure with an object, said device comprising:

a panel having opposing first and second surfaces formed of highly plasticized polyethylene, a plurality of substantially uniformly spaced nodules extending from said first surface and defining sealed cavities, each of said nodules having a dispersion wall extending substantially perpendicularly from said first surface and a body portion defining an axis extending in a longitudinal direction from said dispersion wall with the axis of all of said body portions extending in a common direction and parallel to each other, a mixture of petroleum jelly and dye contained within each of said nodules, and a weakened burst line formed on each of said nodules at a juncture between respective ones of said dispersion walls and said body portions whereby, upon application of a predetermined compressive force to said nodules, said cavities defined by said nodules will be opened at said burst lines to disperse said mixture in a single predetermined direction opposite from the direction of extension of said common direction defined by said axes of said nodules.

14. The device of claim 13, wherein said nodules are positioned across and define an area on said panel, said area having a widthwise and lengthwise dimension and each of said widthwise and lengthwise dimensions being defined by a plurality of nodules positioned at locations spaced both longitudinally and transversely relative to each other.

15. The device of claim 13, wherein said body portion, dispersion wall and burst line of each of said nodules are molded integrally with each other such that said nodules are formed as seamless structures.

16. The device of claim 13, wherein said dispersion wall of each of said nodules includes hinge means for pivotally holding said dispersion wall adjacent to said body portion and said burst line is defined by a seam formed by joining said dispersion wall to said body portion.

17. The device of claim 13, including an adhesive layer on said second surface for attaching said device to said exposed exterior surface.

* * * * *